United States Patent Office 2,818,410
Patented Dec. 31, 1957

2,818,410
DYES OF THE QUINOPHTHALONE SERIES

Frithjof Zwilgmeyer, Wilmington, Del., assignor to E. I. du Pont de Nemours and Company, Wilmington, Del., a corporation of Delaware No Drawing. Application February 23, 1956
Serial No. 567,091

7 Claims. (Cl. 260—288)

This invention relates to novel compounds of the quinophthalone series.

It is an object of this invention to provide novel disperse dyes which are useful for dyeing polyethylene terephthalate fiber, nylon, cellulose acetate and similar hydrophobic fibers. A particular object of this invention is to provide dyes which shall produce upon the mentioned fibers yellow dyeings of good light fastness, good sublimation resistance and good build-up properties. Additional objects and achievements of this invention will appear as the description proceeds.

According to this invention, the above objects are satisfied by a group of novel compounds which may be designated broadly as quinophthalones possessing nitrogenous substituents in the phenyl ring of the phthalone radical. More particularly, my novel compounds may be defined by the general formula

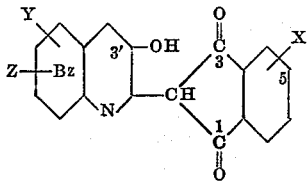

wherein X designates nitro or amino, while Y and Z may designate hydrogen, chlorine, bromine or methyl. Inasmuch as tautomeric rearrangements of this formula are theoretically admissible, for instance, the structure

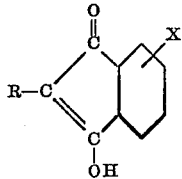

wherein R stands for the hydroxyquinolyl radical and the indicated substitution derivatives thereof, it will be understood that all formulas in this case are to be construed in a liberal sense, to include tautomeric rearrangements of the same formulas.

My novel compounds may be synthesized by condensing a 3-hydroxy-quinaldine having substituents Y and Z as above defined in the Bz nucleus with a nitrophthalic acid. The nitro group in the latter may be in position 3 or 4, the two carboxy groups being in positions 1 and 2. The quinaldine compound may possess a carboxy group in the 4 position, inasmuch as such a group is generally eliminated during the course of the reaction, being replaced by hydrogen. The initial quinaldine material may therefore be defined by the general formula

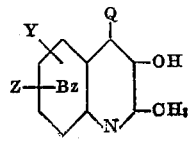

wherein Q stands for H or COOH, while Y and Z stand for hydrogen, halogen or methyl. The substituents Y and Z may be located in any of the four positions of the Bz ring.

Synthesis is generally effected by heating the two components in an inert organic solvent at a temperature of 160° to 250° C. As inert solvent may be employed any common organic liquid which is stable at the reaction temperature, for instance o-dichlorobenzene, trichlorobenzene or nitrobenzene.

The above synthesis produces the novel nitro compounds of this invention. Reduction of the latter, which can be readily achieved for instance by the aid of iron and acetic acid, produces the corresponding amino compounds.

Without limiting this invention, the following examples are given to illustrate my preferred mode of operation. Parts mentioned are by weight.

Example 1.—4-nitro-3'-hydroxyquinophthalone 211 parts of 3-nitrophthalic acid, 203 parts of 2-methyl-3-hydroxyquinoline-4-carboxylic acid, and 2600 parts of o-dichlorobenzene are mixed and heated at 165° to 170° C. for 18 hours. The mixture is allowed to cool to room temperature and is then agitated with 7000 parts of 3% sodium hydroxide solution (in water) and 30 parts of activated charcoal. The slurry is filtered, and the o-dichlorobenzene layer is separated from the aqueous layer. Concentrated aqueous hydrochloric acid is added to the aqueous phase to adjust the alkalinity to pH 8, thereby precipitating 4-nitro-3'-hydroxyquinophthalone from the aqueous solution of its sodium salt. The yellow dye is filtered from this mass, washed salt-free with water, and dried at 100° C. It dyes cellulose acetate, nylon and "Dacron" polyester fibers in yellow shades from an aqueous, disperse dye bath, exhibiting outstanding fastness on these fibers.

If in lieu of 203 part of 2-methyl-3-hydroxyquinoline-4-carboxylic acid above, 159 parts of 2-methyl-3-hydroxyquinoline are used, the identical product is obtained.

Example 2.—5-nitro-3'-hydroxyquinophthalone 5-nitro-3'-hydroxyquinophthalone is prepared by substituting 232 parts of 4-nitrophthalic acid for the 3-nitrophthalic acid in Example 1. The dyeing properties of the 5-nitro derivative are similar to those of 4-nitro-3'-hydroxyquinophthalone.

Example 3.—4-amino-3'-hydroxyquinophthalone

A mixture of 560 parts of ethanol, 525 parts of glacial acetic acid, and 170 parts of powdered iron are mixed and heated to 80° C. The heat is shut off, and 150 parts of 4-nitro-3'-hydroxyquinophthalone are added at such a rate that the heat of reaction stabilizes the temperature of the mixture at 80° C. After all of the 4-nitro-3'-hydroxyquinophthalone has been added, stirring is continued at 80° C. for 16 hours to complete the reduction. The mixture is drowned into a solution of 100 parts of sodium acetate trihydrate in 5000 parts of water, stirred for one hour and filtered. The filter cake containing the 4-amino-3'-hydroxyquinophthalone is washed with water to remove the iron salts, and dried at 100° C. The dye thus obtained produces bright yellow shades on acetate, nylon, and "Dacron" polyester fibers.

Example 4.—5-amino-3'-hydroxyquinophthalone 5-amino-3'-hydroxyquinophthalone is obtained by the substitution of equal parts of 5-nitro-3'-hydroxyquinophthalone for 4-nitro-3'-hydroxyquinophthalone in Example 3. Dyeing properties are similar to those of 4-amino-3'-hydroxyquinophthalone.

Example 5

(a) 2.11 parts of 3-nitrophthalic acid, 3.61 parts of 2-methyl-3-hydroxy-6,8-dibromoquinoline-4-carboxylic acid and 26 parts of o-dichlorobenzene are mixed and heated at 165° to 170° C. for 18 hours. The mixture is allowed to cool below 100° C. and then is agitated with sufficient 30% aqueous sodium hydroxide to render the medium alkaline to Brilliant Yellow paper. The alkaline mass is then filtered, and the filter cake is washed alkali-free with hot water followed by washing with petroleum ether (petroleum hydrocarbon, boiling range 45° to 60° C.). The dried product, 4-nitro-6',8'-dibromo-3'-hydroxyquinophthalone, dyes "Dacron" polyester fiber in yellow shades being somewhat redder than the dyeings obtained from the product of Example 1.

(b) When the 2-methyl-3-hydroxy-6,8-dibromoquinoline-4-carboxylic acid in part (a) of this example is replaced by an equivalent amount respectively of; (b) 2-methyl-3-hydroxy-6-bromoquinoline-4-carboxylic acid, (c) 2-methyl-3-hydroxy-6,8-dichloroquinoline-4-carboxylic acid or (d) 2,8-dimethyl-3-hydroxy-7-chloroquinoline-4-carboxylic acid yellow disperse dyes of similar properties are obtained.

(c) When the 3-nitrophthalic acid in parts (a) and (b) of this example is replaced with the same amount of 4-nitrophthalic acid, the corresponding derivatives of 5-nitro-3'-hydroxyquinophthalone are obtained. The 4- and 5-nitro isomers possess similar shade and dyeing properties.

It will be clear from the above discussion that my invention provides novel compounds which are of great interest in connection with the dyeing of hydrophobic fibers. My novel dyes have good buildup on nylon, cellulose acetate and "Dacron" polyester fibers, and dye these fibers in desirable yellow shades. All of the new compounds exhibit good to excellent light-, sublimation-, and wash-fastness on these fibers. The 4- and 5-nitro derivatives are particularly outstanding as light-fast yellow dyes for "Dacron" polyester fiber.

It will be further understood, that the details of the above examples may be varied within the skill of those engaged in this art.

I claim as my invention:

1. A compound of the formula

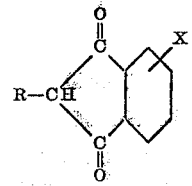

and its tautomers, wherein R represents a hydroxyquinolyl radical of the group consisting of 3-hydroxy-2-quinolyl and its Bz chlorine, bromine and methyl derivatives, while X designates a substituent of the group consisting of nitro and amino.

2. 4-nitro-3'-hydroxyquinophthalone.
3. 5-nitro-3'-hydroxyquinophthalone.
4. 4-amino-3'-hydroxyquinophthalone.
5. 5-amino-3'-hydroxyquinophthalone.

6. A process of producing a coloring matter of the quinophthalone series, which comprises heating one molecule of nitrophthalic anhydride with substantially one molecule of a 2-methyl-3-hydroxyquinoline-4-carboxylic acid in an inert organic solvent at a temperature of 160° to 250° C., and recovering the reaction product.

7. A process as in claim 6, followed by reduction of the recovered compound to convert its nitro group into an amino group.

References Cited in the file of this patent

UNITED STATES PATENTS

| | | |
|---|---|---|
| 1,963,374 | Ogilvie | June 19, 1934 |
| 2,006,022 | Kranzlein | June 25, 1935 |
| 2,121,320 | Kranzlein | June 21, 1938 |

OTHER REFERENCES

Zalukajevs: Latvijas PSR Zintanu Akad. Vestis, 1953, No. 11 (whole No. 75), pages 111–118 as cited in Chem. Abs. vol. 49, 1955, p. 7568.

Venkataraman: The Chem. of Synth Dyes, 2 volumes, Academic Press, 1952, pages 323–328, 457–458 and 1198–99.